United States Patent
Mital et al.

(10) Patent No.: US 10,929,456 B2
(45) Date of Patent: Feb. 23, 2021

(54) INDEXING REFINED OUTPUT OF ARTIFICIAL INTELLIGENCE MODELS

(71) Applicant: Microsoft Technology Licensing, LLC, Redmond, WA (US)

(72) Inventors: Vijay Mital, Kirkland, WA (US); Liang Du, Redmond, WA (US); Ranjith Narayanan, Bellevue, WA (US); Robin Abraham, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 326 days.

(21) Appl. No.: 15/985,440

(22) Filed: May 21, 2018

(65) Prior Publication Data

US 2019/0354633 A1    Nov. 21, 2019

(51) Int. Cl.
*G06F 16/36* (2019.01)
*G06F 16/901* (2019.01)
(Continued)

(52) U.S. Cl.
CPC .......... *G06F 16/36* (2019.01); *G06F 16/901* (2019.01); *G06F 16/904* (2019.01); *G06F 16/90328* (2019.01); *G06N 20/00* (2019.01)

(58) Field of Classification Search
CPC ...... G06F 16/36; G06F 16/901; G06F 16/904; G06F 16/90328; G06N 20/00
(Continued)

(56) References Cited

U.S. PATENT DOCUMENTS 7,822,699 B2 * 10/2010 Katariya ............ G06F 16/3334
706/45
8,156,059 B2 * 4/2012 Dunning ................ G06N 20/00
706/45
(Continued)

FOREIGN PATENT DOCUMENTS

CA        2747145 A1    1/2013

OTHER PUBLICATIONS

Zou, Guobing, et al., "An Ontology-based Methodology for Semantic Expansion Search", Fifth International Conference on Fuzzy Systems and Knowledge Discovery, IEEE Computer Society, © 2008, pp. 453-457.*

(Continued)

*Primary Examiner* — Robert Stevens
(74) *Attorney, Agent, or Firm* — Workman Nydegger

(57) ABSTRACT

The improved exercise of artificial intelligence by systematically refining and semantically indexing the output from AI models, so that the semantic index is highly relevant. To do this, the computing system obtains results of an input data set being applied to an AI model. The computing system then determines a refinement to apply to the obtained results. This determination may be based on one or more characteristics of the AI model and/or input data set. The determination may also be based on hints associated with that AI model, and/or learned behavior regarding how that AI model is typically used. The obtained results are then refined using the determined refinement. It is then this more relevant refined results that are semantically indexed to generate the semantic index. Thus, the semantic index represents, the more useful output from an AI model, which is semantically exposed so as to provide meaning.

19 Claims, 6 Drawing Sheets

(51) Int. Cl.
*G06F 16/904* (2019.01)
*G06F 16/9032* (2019.01)
*G06N 20/00* (2019.01)

(58) Field of Classification Search
USPC .......................................................... 707/741
See application file for complete search history.

(56) References Cited

U.S. PATENT DOCUMENTS

| | | | | |
|---|---|---|---|---|
| 9,218,427 | B1* | 12/2015 | Thompson, III | ............................ G06F 16/24573 |
| 2007/0203869 | A1* | 8/2007 | Ramsey | .................. G06F 40/35 706/52 |
| 2012/0288844 | A1* | 11/2012 | Anand | ..................... G09B 7/08 434/353 |
| 2015/0269176 | A1* | 9/2015 | Marantz | ............ G06F 16/90324 707/767 |
| 2017/0060844 | A1* | 3/2017 | He | .......................... G06F 40/30 |
| 2017/0293627 | A1* | 10/2017 | Thompson, III | .... G06F 16/9537 |
| 2018/0032901 | A1* | 2/2018 | Chowdhury | ........... G06N 20/10 |
| 2018/0052929 | A1* | 2/2018 | Liu | ........................ G06F 16/951 |
| 2018/0089171 | A1 | 3/2018 | Arquero et al. | |
| 2018/0157749 | A1* | 6/2018 | Statchuk | ............. G06F 16/3322 |
| 2018/0239771 | A1* | 8/2018 | Diaz De Arcaya | ... G06F 16/316 |

OTHER PUBLICATIONS

Djamel, Nessah, "A Model Based Agents and Ontology for Semantic Information Search", Research Challenges in Information Science (RCIS 2009), Fez, Morocco, Apr. 22-24, 2009, pp. 421-426.*
Amato, Flora, et al., "SemTree: an index for supporting semantic retrieval of documents", AUTO '93, Antonio, TX, Sep. 20-23, 1993, pp. 367-375.*
Microsoft Computer Dictionary, 5th Edition, Microsoft Press, Redmond, WA, © 2002, pp. 269-270.*
"International Search Report and Written Opinion Issued in PCT Application No. PCT/US2019/030974 ", dated Jul. 16, 2019, 12 Pages.

* cited by examiner

INDEXING REFINED OUTPUT OF ARTIFICIAL INTELLIGENCE MODELS

BACKGROUND

Computing systems and associated networks have greatly revolutionized our world. Computing systems are now able to engage in various levels of artificial intelligence. Artificial intelligence is a process in which a non-living entity (such as system(s), device(s), or combinations thereof) receives and interprets data to add structure to at least portions of the data.

Artificial intelligence may classify the data it receives. As a relatively intuitive example, an "image example" and a "video example" will often be referred to in which the data input to the artificial intelligence is an image or video, respectively. In the image example, artificial intelligence may take raw image data, determine what objects are represented within the image, identify the object, and perhaps determine properties of those objects. For instance, the artificial intelligence may determine the object's position, orientation, shape, size, and so forth. The artificial intelligence may also determine the object's relationship with other objects such as relative position, and/or organize objects having similarly characteristics. The artificial intelligence may also output confidence levels regarding its determinations. In the video example, the artificial intelligence may also make predictions, such as whether two objects will collide, again perhaps with confidence levels regarding those predictions. The artificial intelligence may also estimate where the objects have been.

Technology has not yet reached a point of generalized intelligence, in which any data may be interpreted in any fashion. However, AI models are used that are tailored to making particular kinds of determinations based on particular kinds of data. Some AI models may be very specific in function, such as determining from X-ray data, whether a weld will fracture. Some AI models may be more general, such as identifying objects within an image. There are a number of tools conventionally available for developing new AI models. At present, there are an enormous number of conventional AI models available, each tailored for purposes of varying specificity, and each being of different quality. Furthermore, the number of available AI models is growing very fast.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the improved exercise of artificial intelligence. Raw output data is obtained by applying an input data set to an artificial intelligence (AI) model. Such raw output data is sometimes difficult to interpret. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way for a computing system to refine and semantically index the output from AI models, so that the semantic index is highly relevant.

To do this, the computing system obtains results of an input data set being applied to an AI model. The computing system then determines a refinement to apply to the obtained results. This determination may be based on one or more characteristics of the AI model and/or input data set. The determination may also be based on hints associated with that AI model, and/or learned behavior regarding how that AI model is typically used. The obtained results are then refined using the determined refinement. It is then this more relevant refined results that are semantically indexed to generate the semantic index.

Thus, the semantic index represents, the more useful output from an AI model, which is semantically exposed so as to provide meaning. For instance, that semantic index may be used to provide suggested queries to a user, query against using relevant operators and terms, and visualize the results using relevant visualization. An improved mechanism for realizing the results of an AI model is thus described. The mechanism may be applied across a wide variety of input data sets, AI models, or combinations thereof.

This summary is provided to introduce a selection of concepts in a simplified form that are further described below in the Detailed Description.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
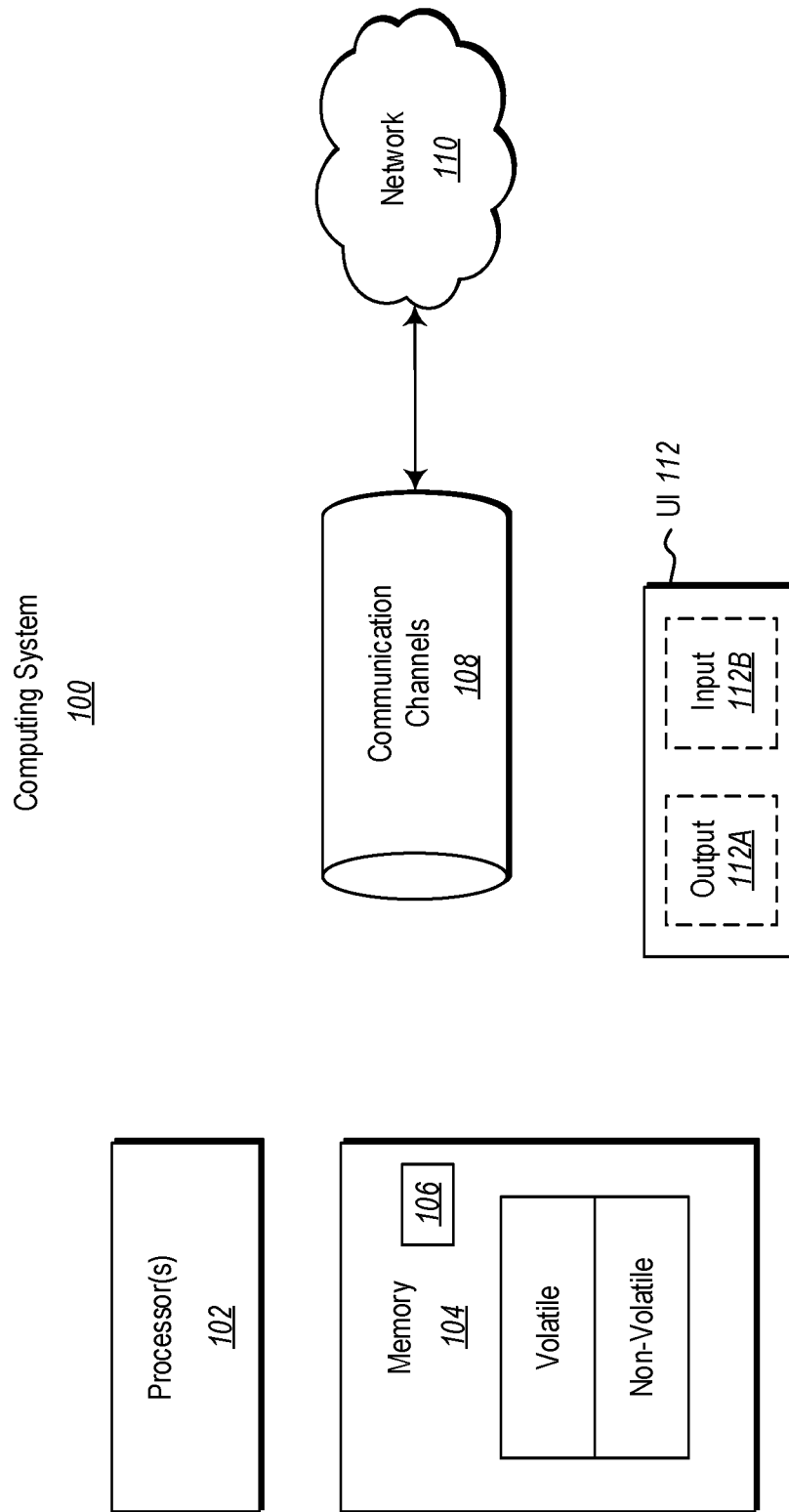
FIG. 1 illustrates an example computer system in which the principles described herein may be employed.

At least some embodiments described herein relate to the improved exercise of artificial intelligence. Raw output data is obtained by applying an input data set to an artificial intelligence (AI) model. Such raw output data is sometimes difficult to interpret. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way for a computing system to refine and semantically index the output from AI models, so that the semantic index is highly relevant.

To do this, the computing system obtains results of an input data set being applied to an AI model. The computing system then determines a refinement to apply to the obtained results. This determination may be based on one or more characteristics of the AI model and/or input data set. The determination may also be based on hints associated with that AI model, and/or learned behavior regarding how that AI model is typically used. The obtained results are then refined using the determined refinement. It is then this more relevant refined results that are semantically indexed to generate the semantic index.

Thus, the semantic index represents, the more useful output from an AI model, which is semantically exposed so as to provide meaning. For instance, that semantic index may be used to provide suggested queries to a user, query against using relevant operators and terms, and visualize the results using relevant visualization. An improved mechanism for realizing the results of an AI model is thus described. The mechanism may be applied across a wide variety of input data sets, AI models, or combinations thereof.

Because the principles described herein operate in the context of a computing system, a computing system will be described with respect to FIG. 1. Then, the refining and semantic indexing of results of input data set(s) applied to AI model(s) will then be described with respect to FIGS. 2 through 4. An environment having a large number of input data sets and AI models will be described with respect to FIG. 5. Then a characterization structure that may be used to allow the principles described herein to effectively operate in such an environment will be described with respect to FIG. 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
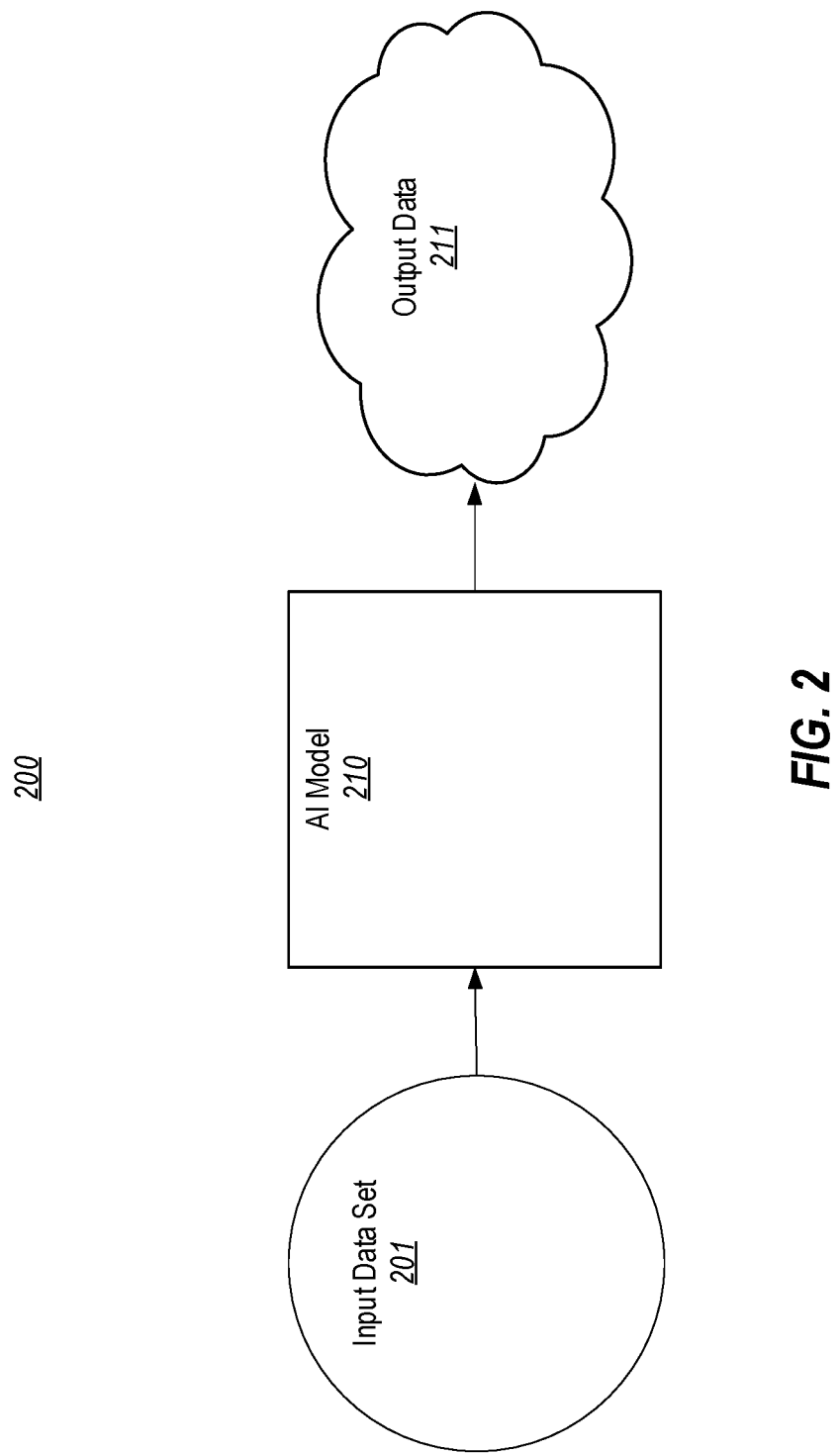
FIG. 2 illustrates an environment in which an input data set is applied to an AI model to generate output data.

FIG. 2 illustrates an environment 200 in which an input data set 201 is applied to an AI model 210 to generate output data 211. An example of an AI model is a machine learning model in which the AI model learns by experiencing. Another example of an AI model is a rules-based model in which the AI model does not learn per se, but responds to rules and parameters.

The output data 211 is represented as a cloud to represent that the AI model 210 may generate a large volume of data that is difficult to sift through to find relevant information. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way to refine and semantically index the output from a wide variety of AI models. In this way, the semantic index represents highly relevant information, which is then semantically exposed to meaningfully reason upon. For instance, such relevant information may be used to provided suggested queries, query against using relevant operators and terms, and present query results using helpful visualizations.

Figure 3:
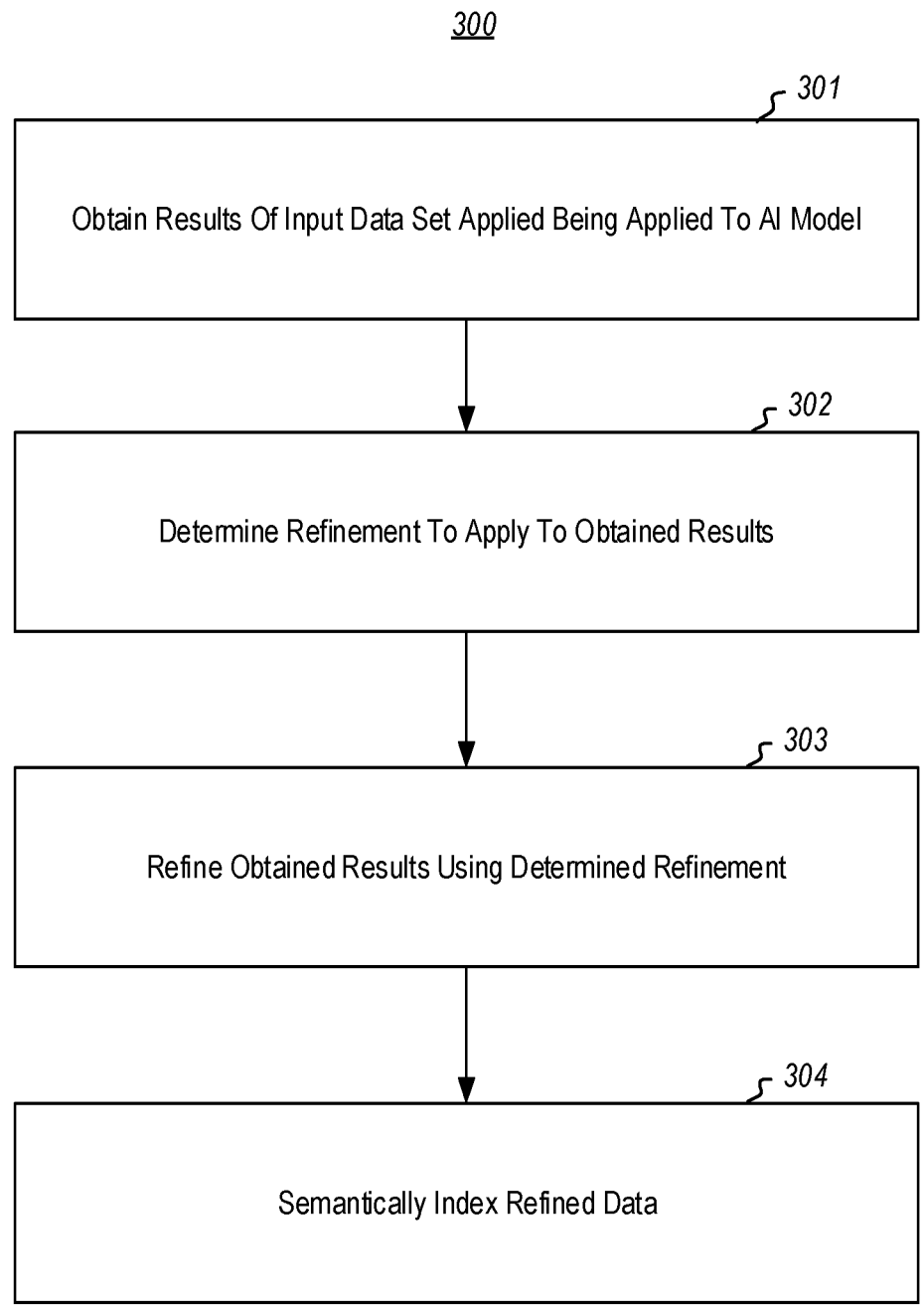
FIG. 3 illustrates a method for a computing system to exercise artificial intelligence by refining and semantically indexing AI model output in accordance with the principles described herein.

FIG. 3 illustrates a flowchart of a method 300 for a computing system to semantically index refined results from a data input set being applied to an AI model. The method 300 may be performed by the computing system 100 of FIG. 1. As an example only, the method 300 may be performed by the computing system 100 with the aid of a computer program product comprising one or more computer-readable storage media, on which there are executable instructions that are structured such that, when executed by the processor(s) 102 of the computing system 100, the computing system 100 is caused to perform the method 300.

Figure 4:
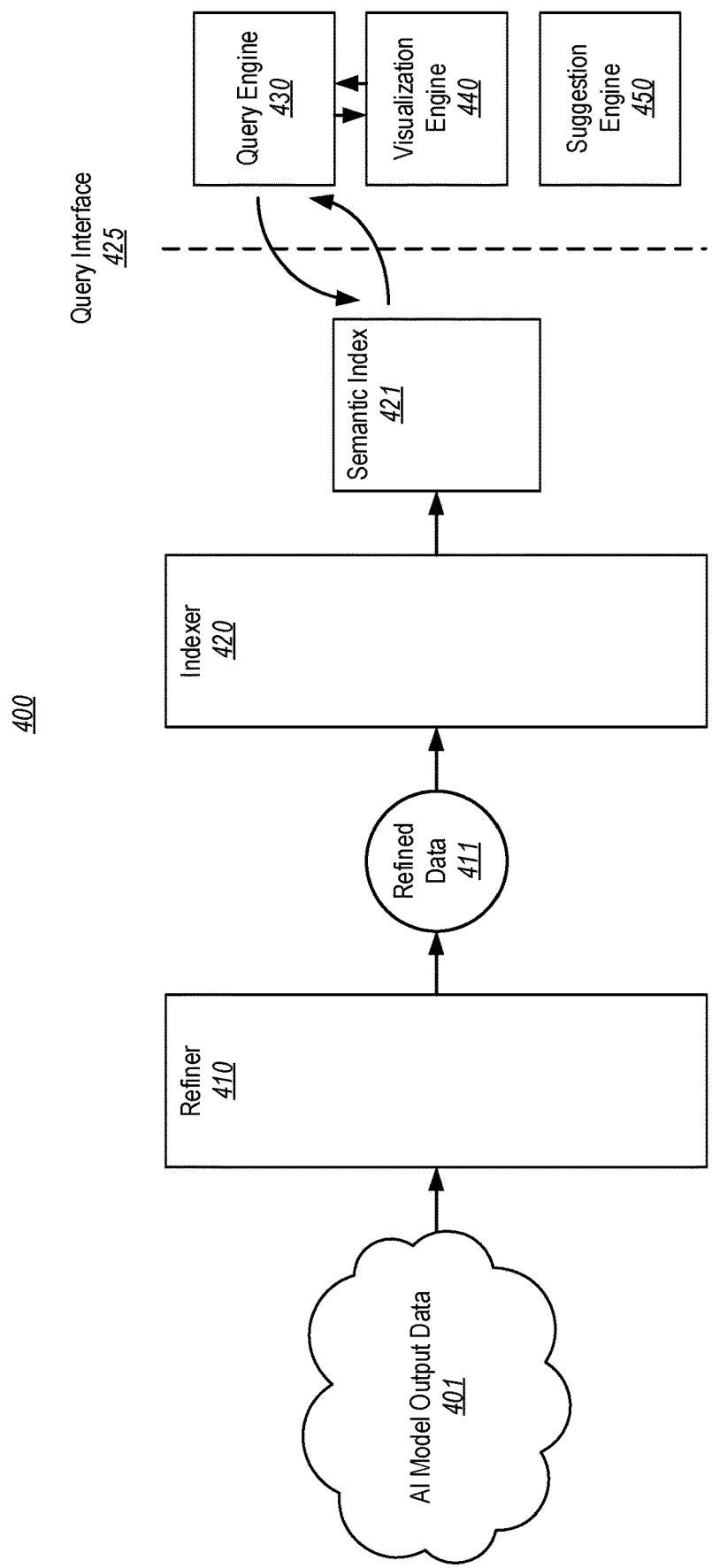
FIG. 4 illustrates a processing flow accomplished by performance of the method of FIG. 3.

In accordance with the method 300 of FIG. 3, the computing system obtains results of an input data set being applied to an AI model (act 301). For instance, referring to FIG. 2, an input data set 201 is applied to an AI model 210 to generate output data 211. This output data 211 is an example of the resulted obtained by the computing system in act 301. FIG. 4 illustrates a processing flow 400 accomplished by performance of the method 300. The processing flow begins with the obtained results 401 from the AI model. A refiner component 410 is shown as a component of the computing system that accesses the obtained results 401. These obtained results 401 are represented as a cloud as it is an example of the output data 211 of FIG. 2. Again, the obtained results 401 may be very difficult to interpret to extract desired information. Furthermore, due to its complexity and volume, it may take a long time to semantically index.

In accordance with the method 300, the computing system, then determines a refinement to apply to the obtained results (act 302). The refinement may involve any process that is calculated to make the AI model output data more relevant. Since relevance may be specific to an input data set representation and/or an AI model representation (i.e., a given operational AI model representation), a different refinement may be expressed for each operational AI model representation. As an example only, refinement may involve removal, transformation, or prioritizing the raw output data. For instance, the refinement may involve filtering out some of the AI model output. The refinement may involve truncating, converting, combining, and/or otherwise transforming portions of the AI model output. The refinement may involve prioritizing portions of the output by perhaps ordering or ranking the output, tagging portions of the AI model output, and so forth.

Referring to FIG. 4, the refiner component 410 may make this determination in response to input 402. This input 402 may include one or more characteristics of the AI model to which the input data set was applied. For instance, the input 402 may include one or more characteristics of the AI model 210 if the obtained results 401 are the output data 211 from FIG. 2. Alternatively or in addition, the input 402 may include one or more characteristics of the input data set that was applied to the AI model. For instance, the input 402 may include one or more characteristics of the input data set 201 when the obtained results 401 is the output data 211 from FIG. 2.

However, that refinement may be modified in accordance with hints that are specific to an AI model. Those hints may be provided by the author of a particular AI model. In one embodiment, when an author creates an AI model, the AI model is associated with a wrapper (or other model-specific data structure) in which refinement hints are provided, perhaps as specific as designating hints with respect to an input data set expression. The refinement may also be modified or augmented by machine learning analysis based on prior refinements of obtained result on an input data set applied to an AI model. This learned information may have application broadly, even globally, but may also be very granular, down to the user level, or even down to the per user and per situation level.

In accordance with the method 300, the computing system, then refines the obtained results using the determined refinement (act 303). Referring to FIG. 4, for example, the refiner component 410 generates the refined data 411. The refined data 411 contains much more relevant and refined information than the raw output data of the AI model. The refined data is then semantically indexed to generate a semantic index (act 304). In FIG. 4, an indexer 420 operates upon the refined data to generate a semantic index 421. This semantic index 421 is in the semantic space that a user can understand and reason with. Furthermore, because of the refinement process, the information represented within the semantic index is highly relevant. This allows for much more efficient querying against the semantic index 421.

The semantic indexing may be performed on sections of the refined data 411. For instance, performing semantic indexing on one section of the refined data will produce a different semantic index that when performing semantic indexing on another section of the refined data, or perhaps on the entirety of the refined data. Thus, the semantic indexing may result in multiple semantic indexes from the same refined data. Such might be helpful when there may be multiple semantic spaces that are potentially to be used or interfaced with.

The number of ways in which the semantic index may be used or interfaced with is enormous, particularly if the semantic index is generated based on refined intelligence. In FIG. 4, for example, the query engine 430 may interface with the semantic index 421 through the query interface 425. The semantic index 421 may be used by a suggestions engine 450, which may then form relevant suggested queries to the user. As yet another example, the semantic index 421 may be used by a visualizations engine 440 to determine an appropriate visualization for results of particular queries.

The method 300 may be repeatedly performed. For instance, even if the input data set is not completely switched out, but instead is merely modified or augmented, that may still result in a change in the obtained results 401. Potentially, such would also change the characteristics of the input data set sufficient to alter the input 402 to the refiner component 410, thereby even potentially changing the determined refinement. Thus, in this case, the method 300 may be repeated on the modified obtained results 401 and/or the modified input 402.

Likewise, even if the AI model is not completed switched out for another AI model, but instead is updated or incrementally changed, that may still result in a change in the obtained results 401. Potentially, such would also change the characteristics of the AI model sufficient to alter the input 402 to the refiner component 410, thereby even potentially changing the determined refinement. Thus, in this case, the method 300 may be repeated on the modified obtained results 401 and/or the modified input 402.

In this way, as the AI model is updated or the input data set changed somewhat, the semantic index may likewise change accordingly. The changed semantic index may also represent the way the semantic index changed. A semantic index that has been changed may also represent its own history of change. This may be helpful when suggested queries depends on the change history of the semantic index.

Of course, the method 300 may be performed when applying a different input data set to the same AI model, or when applying the same or a different input data set to a different AI model. Varying the input data set and/or the AI model would of course result in the obtained data being different (e.g., different obtained results 401 in FIG. 4), which would result in different refined data (e.g., different refined data 411 in FIG. 4), and thus a different semantic index (e.g., a different semantic index 421 in FIG. 4). The refinement would also be different as the input 402 would be different, as well as the obtained results 401.

In one embodiment, the method 300 may be performed in an environment in which there are a large number of input data sets and AI models available. For instance, at present, there are an enumerable number of input data sets and AI models that are available for public use. In this case, the use of an AI model collection characterization structure may be helpful. This environment will be described with respect to FIG. 5. The characterization structure will then be described with respect to FIG. 6.

Figure 5:
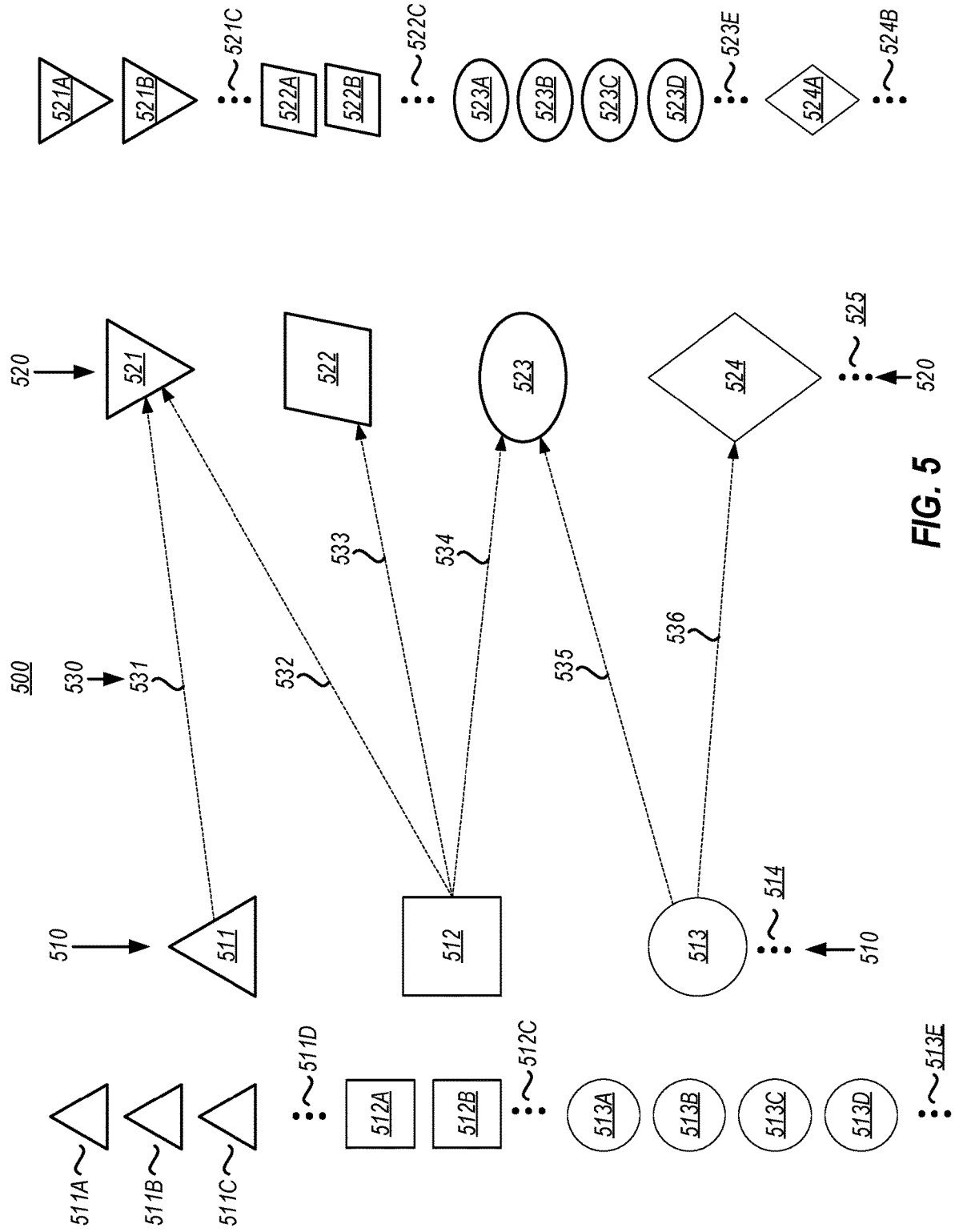
FIG. 5 illustrates an environment that illustrates multiple input data set types and multiple AI model types.

FIG. 5 illustrates an environment 500 that illustrates multiple input data set types 510 and multiple AI model types 520. In the illustrated embodiment, there are three input data set types shown including input data set types 511, 512 and 513. However, the ellipsis 514 represents that there may be any number (and perhaps an enumerable and fast-growing number) of input data set types available for use within the environment 500. Also, the AI model types 520 are shown including four AI model types 521, 522, 523 and 524. However, the ellipsis 525 represents that there may be any number (and perhaps an enumerable and fast-growing number) of AI model types available for use within the environment 500.

Within each input data set type 510, there may be one or more input data sets or input data set subtypes that are available. For instance, within the first input data set type 511, there are a number of input data sets 511A, 511B and 511C. The ellipsis 511D represents that there may be any number of input data sets of the first input data set type 511. Any of the input data sets 511A, 511B or 511C may instead be an input data set subtype representing a more specific type of the input data set type 511. Thus, the input data set type 511 may more generally be the root node in a conceptual hierarchy of input data set types, where the leaf nodes in the hierarchy may contain one or more input data sets. The same thing may be said for any of the input data set types 510. This conceptual hierarchy is "conceptual" in the sense that they may be grouped or treated the same depending on shared characteristics. This one of more characteristics may be part of the input 402 in FIG. 4.

Throughout FIG. 5, an input data set type is represented with a larger shape, whereas an input data set (or input data set subtype) of that input data set type is represented by a smaller form of that same shape. For instance, the input data set type 511 is represented as a larger upward-pointed triangle, and the input data sets 511A, 511B and 511C of that type 511 are represented by smaller upward-pointed triangle.

Within the second input data set type 512 (represented as a larger square) there are also a number of input data sets 512A and 512B or input data set subtypes (represented as a smaller square). Within the third input data set type 513 (represented as a larger circle) there are also a number of input data sets 513A through 513D or input data set subtypes (represented as a smaller circle). The ellipses 511D, 512C and 513E represent that there may be any number of input data sets or input data set subtypes for any given input data set type.

Turning now to the AI model types 520, within each AI model type, there may be one or more AI models or AI model subtypes that are available. For instance, within the first AI model type 521, there are a number of AI models 521A and 521B. The ellipsis represents that there may be any number of AI models of the first AI model type 521. Any of the AI models 521A and 521B may instead be an AI model subtype representing a more specific type of the AI model type 521. Thus, the AI model type 521 may more generally be the root node in a conceptual hierarchy of AI model types, where the leaf nodes in the hierarchy may contain one or more AI models. The same thing may be said for any of the AI model types 520. This conceptual hierarchy is "conceptual" in the sense that they may be grouped or treated the same depending on shared characteristics. This one of more characteristics may be part of the input 402 in FIG. 4.

Again, throughout the figures, an AI model type is represented with a larger shape, whereas an AI model (or AI model subtype) of that AI model type is represented by a smaller form of that same shape. For instance, the AI model type 521 is represented as a larger downward-pointed triangle, and the AI models 521A and 521B are represented by smaller downward-pointed triangle.

Within the second AI model type 522 (represented as a parallelogram) there are also a number of AI model models 522A and 522B or AI model subtypes (represented as a smaller parallelogram). Within the third AI model type 523 (represented as an oval) there are also a number of AI models 523A through 523D or AI model subtypes (represented as a smaller oval). Within the fourth AI model type 524 (represented as a rhombus) there is an AI model 524A or AI model subtypes (represented as a smaller rhombus). The ellipses 521C, 522C, 523E and 524B represent that there may be any number of AI models or AI model subtypes for any given AI model type.

The broad point is that there exists an environment 500 in which there are a larger number of available input data sets, and a larger number of AI models. The input data sets may be classified by type or subtype. Furthermore, the AI models may be classified by type or subtype. Thus, the hierarchy of input data set types is merely conceptual, as is the hierarchy of AI models. The environment 500 may be, for instance, a global environment, such as the Internet. However, the environment 500 may also be any environment in which a multiple AI models are available to apply to input data sets.

The arrows 530 represent that for any given input data set type, input data sets of that input data set type may be applied to AI models of an AI model type. In this example, input data sets of the input data set type 511 may be applied to AI models of the AI model type 521 (as represented by arrow 531). Alternatively or in addition, input data sets of the input data set type 512 may be applied to AI models of the AI model type 521 (as represented by arrow 532). Input data sets of the input data set type 512 may also be applied to AI models of the AI model type 522 (as represented by arrow 533), and to AI models of the AI model type 523 (as represented by arrow 534). Input data sets of the input data set type 513 may be applied to AI models of the AI model type 523 (as represented by arrow 535), and to AI models of the AI model type 524 (as represented by arrow 536).

More generally, the arrows 530 represents operational combinations of input data set types and AI model types. At a more refined granularity, there may also be operational combinations of input data sets and AI model types, where operational combinations are available per input data set type for each of the AI model types. Similarly, there may also be operational combinations of input data set types and specific AI models. At the most refined granularity of combinations, there may be operational combinations of input data sets and AI models. Generally stated, within the environment 300, there are operational combinations of (on the one hand) input data sets, input data set subtypes, and/or input data set types, and (on the other hand) AI models, AI model subtypes, and/or AI model types. Such operational combinations may also be referred to generally hereinafter as "data/model combinations".

Figure 6:
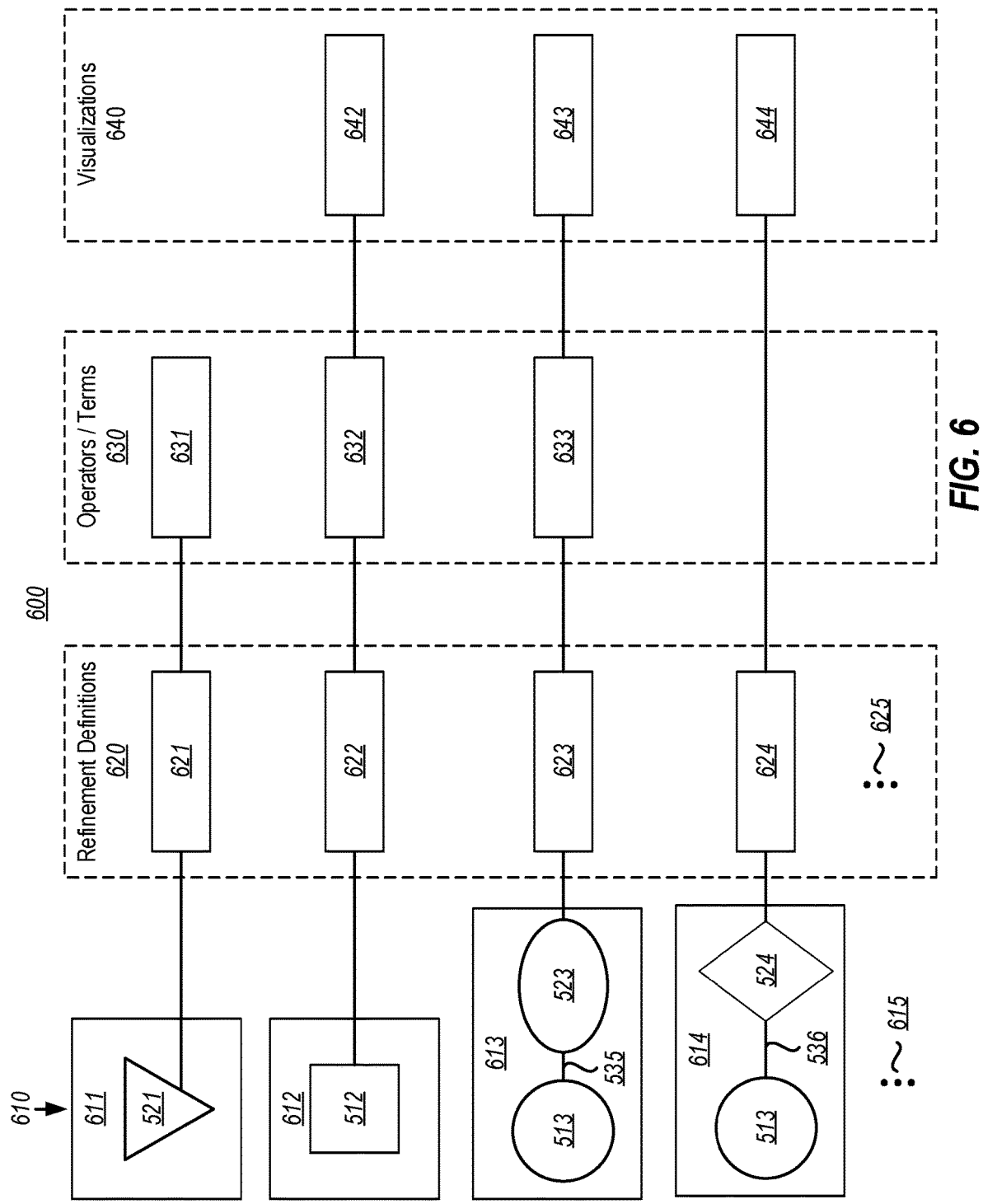
FIG. 6 illustrates an artificial intelligence (AI) model collection characterization structure that may be used to refine raw output data resulting from input data set(s) applied to an AI model.

FIG. 6 illustrates an artificial intelligence (AI) model collection characterization structure 600 (also referred to hereinafter as a "characterization structure") that may be used to refine raw output data resulting from input data set(s) applied to an AI model. The characterization structure 600 represents, for each of multiple AI models, a refinement of results of an input data set applied to an AI model. This may performed by having at the foundation of the characterization structure what will be referred to herein as "operational AI model representation" (the meaning of this term will be described further below).

FIG. 6 illustrates that the characterization structure 600 includes multiple operational AI model representations 610 including operational AI model representations 611 through 614. However, the ellipsis 615 represents that the characterization structure 600 may include any number (and perhaps an enumerable number) of operational AI model representations.

The characterization structure 600 also includes refinement definition 620 for each of the operational AI model representations. The refinement definitions 620 thus includes refinement definition 621 associated with operational AI model representation 611, refinement definition 622 associated with operational AI model representation 612, refinement definition 623 associated with operational AI model representation 613, and refinement definition 624 associated with operational AI model representation 614. The ellipses 625 represents that there may be a refinement definition for each of the operational AI model representations 610.

AI model representations 611 through 614 are provided by way of example merely as a starting point for describing some of the breadth of the term "operational AI model representation". For instance, the operational AI model representation 611 is illustrated as identifying a single AI model type (in this case, AI model type 521 from FIG. 5). This means that the operational AI model representation is not a data/model combination, but merely an AI model expression. In this case, that AI model expression is an identification of an AI model type without reference to any input data set type. This means that regardless of the input data set that is applied to an AI model of the AI model type 521, the refinement definition 621 is associated with that AI model. An AI model expression may include an AI model type or multiples thereof, an AI model subtype or multiples thereof, and/or an AI model or multiples thereof. Thus, an AI model expression may very precisely and compactly define sets of any number of AI models.

On the other hand, the operational AI model representation 612 is illustrated as identifying a single input data set type (in this case, input data set type 512) from FIG. 5). This means that this operational AI model representation 612 is also not a data/model combination, but merely an input data set expression. In this case, that input data set expression is an identification of an input data set type without reference to any AI model expression. This means that regardless of the AI model to which an input data set of that input data set type 512 is applied, the refinement definition 622 is associated with that input data set. An input data set expression may include an input data set type or multiples thereof, an input data set subtype or multiples there, and/or an input data set or multiples thereof. Thus, an input data set expression may very precisely and compactly define sets of any number of input data sets.

The operational AI model representation 613 is represented by a data/model combination. Specifically, the AI model representation 613 includes a combination of the input data set type 513 and the AI model type 523. Recall that in FIG. 5, as represented by arrow 535, this is an operational data/model combination. This operational AI model representation 613 means that the refinement 623 is associated with the data/model combination that includes all combinations of an input data set of the input data set type 513 applied to an AI model of the AI model type 523.

The operational AI model representation 614 is also represented by a data/model combination. Specifically, the AI model representation 614 includes a combination of the input data set type 513 and the AI model type 524. Recall that in FIG. 5, as represented by arrow 536, this is an operational data/model combination. This operational AI model representation 614 means that the refinement definition 624 is associated with the data/model combination that includes all combinations of an input data set of the input data set type 513 applied to an AI model of the AI model type 524.

More generally speaking, an operational AI model representation may include a data/model combination in which the input data set(s) are defined by a particular input data set expression and in which the AI model(s) are defined by a particular AI model expression. In such a case, the associated refinement definition is applicable when an input data set that satisfies the input data set expression is applied to an AI model that satisfies the AI model expression. Thus, data/model combinations may be very precisely and compactly defined, even when there are a large number of input data sets and AI models. Furthermore, operational AI model representations 610 may be compactly and precisely defined.

Such a characterization structure 600 may be used to obtain a refinement definition (which may be modified or augment by hints or machine learning) for a wide variety of input data set(s) and AI model(s). For instance, the refinement may be performed in accordance with the applicable refinement definition. For instance, if the operation AI model representation 413 is applicable, then the associated refinement of the refinement definition 423 may be performed. However, as previously stated, that refinement may be modified in accordance with hints that are specific to an AI model, or machine learning.

The characterization structure 600 may also help in how the semantic index is used. In FIG. 4, for example, the query engine 430 may interface with the semantic index through the query interface 425 using varying operators and terms. These operators and terms may also be included within the characterization structure 600 as operators/terms 630. For instance, the operational AI model representations 611 through 613 are associated with operator/term sets 631, 632 and 633, respectively. Thus, the characterization structure 600 may be used to quickly determine appropriate operators and terms to interface with the semantic index. These operators and terms may also be communicated to the suggestion engine 450 to allow for relevant suggestions to be formulated and presented to a user.

As yet another example, the semantic index may be used to determine an appropriate visualization for results of particular queries. These visualization(s) may also be included within the characterization structure 600 as visualizations 640. For instance, the operational AI model representations 612 through 614 are associated with visualization sets 642, 6443 and 644, respectively. Thus, the characterization structure 600 may be used to quickly determine appropriate visualizations to use to present query results to a user.

Accordingly, the principles described herein provide an effective mechanism for refining results from input data being applied to AI models, such that the refined data is much more relevant. Furthermore, that refined data is then index to place that relevant information within the user's semantic space, such that queries may be generated against that semantic space, suggestions may be generated using that semantic space, and such that results of queries against the semantic space may be intuitively presented to the user through appropriate visualization. This is true even for a wide-variety of input data sets and AI models.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, configure the computing system to perform the following:
obtain results of an input data set applied to an AI model;
determine a refinement to apply to the obtained results, the determination based at least on one or more characteristics of the AI model;
refine the obtained results using the determined refinement; and
semantically index the refined results to generate a semantic index, semantically indexing comprising:
determining that the refined results have at least a first section and a second section that are to be semantically indexed;
semantically indexing a first section of the refined results to generate a first semantic index; and
semantically indexing a second section of the refined results to generate a second semantic index.

2. The computing system in accordance with claim 1, the determined refinement also being based on at least one of more characteristics of the input data set that was applied to the AI model.

3. A method for a computing system to semantically index refined results from a data input set being applied to an AI model, the method comprising:
obtaining results of an input data set applied to an AI model;
determining a refinement to apply to the obtained results, the determination based at least on one or more characteristics of the AI model;
refining the obtained results using the determined refinement; and
semantically indexing the refined results to generate a semantic index, semantically indexing comprising:
determining that the refined results have at least a first section and a second section that are to be semantically indexed;
semantically indexing a first section of the refined results to generate a first semantic index; and
semantically indexing a second section of the refined results to generate a second semantic index.

4. The method in accordance with claim 3, the determined refinement also being based on at least one of more characteristics of the input data set that was applied to the AI model.

5. The method in accordance with claim 3, the determined refinement also being based on hints specific to the AI model.

6. The method in accordance with claim 5, the hints specific to the AI model being within a model-specific data structure that is associated with the AI model.

7. The method in accordance with claim 3, the determined refinement also being based on machine learning analysis of prior refinements of obtained results from the AI model.

8. The method in accordance with claim 3, the determined refinement also being based on machine learning analysis of prior refinements of obtained results of the input data set applied to an AI model.

9. The method in accordance with claim 3, the determined refinement also being based on machine learning analysis of prior refinements of obtained results of data applied to an AI model when those obtained results are provided for a particular user, such that the refining is specific to the particular user.

10. The method in accordance with claim 3, further comprising:
using the semantic index to present a suggested query to a user.

11. The method in accordance with claim 3, the AI model comprising a machine learning model.

12. The method in accordance with claim 3, the obtained results being first obtained results, the refined results being first refined results, the semantic index being a first semantic index, the input data set being a first input data set, the determined refinement being a first determined refinement, the method further comprising:
obtaining results of a second input data set applied to the AI model to obtain second obtained results;
determining a second refinement to apply to the second obtained results, the second determined refinement based at least on one or more characteristics of the AI model, the second determined refinement being different than the first determined refinement;
refining the second obtained results using the second determined refinement to obtained second refined results; and
semantically indexing the second refined results to generate a second semantic index.

13. The method in accordance with claim 12, the second determined refinement also being based on at least one of more characteristics of the second input data set that was applied to the AI model.

14. The method in accordance with claim 3, the AI model being a first AI model, the obtained results being first obtained results, the refined results being first refined results, the semantic index being a first semantic index, the input data set being a first input data set, the determined refinement being a first determined refinement, the method further comprising:
    obtaining results of a second input data set applied to a second AI model to obtain second obtained results;
    determining a second refinement to apply to the second obtained results, the second determined refinement based at least on one or more characteristics of the second AI model, the second determined refinement being different than the first determined refinement;
    refining the second obtained results using the second determined refinement to obtained second refined results; and
    semantically indexing the second refined results to generate a second semantic index.

15. The method in accordance with claim 3, further comprising:
    detecting a change in the refined results; and
    re-indexing the refined results to change the semantic index.

16. The method in accordance with claim 15, the detection of the change in the refined results comprising:
    detecting a change in the input data set or the AI model to which the input data set is applied;
    re-determining a refinement to apply to the obtained results, the re-determination based at least on one or more characteristics of the AI model; and
    re-refining the obtained results using the re-determined refinement.

17. The method in accordance with claim 15, the changed semantic index representing a way the semantic index changed.

18. The method in accordance with claim 3, wherein the first semantic index of the first section of the refined results may be queried against, and the second semantic index of the second section of the refined results may also be queried against.

19. A computer program product comprising one or more computer-readable storage media having thereon computer-executable instructions that are structured such that, when executed by one or more processors of a computing system, configure the computing system to perform the following:
    obtain results of an input data set applied to an AI model;
    determine a refinement to apply to the obtained results, the determination based at least on one or more characteristics of the AI model;
    refine the obtained results using the determined refinement; and
    semantically index the refined results to generate a semantic index, semantically indexing comprising:
        determining that the refined results have at least a first section and a second section that are to be semantically indexed;
        semantically indexing a first section of the refined results to generate a first semantic index; and
        semantically indexing a second section of the refined results to generate a second semantic index.

* * * * *